United States Patent
Bolz et al.

(10) Patent No.: US 7,367,302 B2
(45) Date of Patent: May 6, 2008

(54) METHOD AND DEVICE FOR SWITCHING ON A POWER SWITCH ARRANGED BETWEEN CAPACITIVE ELEMENTS

(75) Inventors: Stephan Bolz, Pfatter (DE); Rainer Knorr, Regensburg (DE); Günter Lugert, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 352 days.

(21) Appl. No.: 10/531,122

(22) PCT Filed: Sep. 15, 2003

(86) PCT No.: PCT/DE03/03053

§ 371 (c)(1),
(2), (4) Date: May 10, 2005

(87) PCT Pub. No.: WO2004/034543

PCT Pub. Date: Apr. 22, 2004

(65) Prior Publication Data

US 2006/0048733 A1 Mar. 9, 2006

(30) Foreign Application Priority Data

Oct. 9, 2002 (DE) .............................. 102 47 112

(51) Int. Cl.
*H02H 9/00* (2006.01)
*H02H 7/22* (2006.01)
*F02N 11/08* (2006.01)
*F02N 17/00* (2006.01)

(52) U.S. Cl. ................... 123/179.3; 318/141

(58) Field of Classification Search ............. 123/179.3, 123/179.1; 290/27, 31, 38 R; 318/141
See application file for complete search history.

(56) References Cited

U.S. PATENT DOCUMENTS

| | | | | |
|---|---|---|---|---|
| 3,596,105 | A * | 7/1971 | Segrest | 290/46 |
| 5,642,696 | A * | 7/1997 | Matsui | 123/179.1 |
| 5,998,976 | A * | 12/1999 | Steffan | 322/10 |
| 6,032,632 | A * | 3/2000 | Bolenz et al. | 123/179.3 |
| 6,718,927 | B2 | 4/2004 | Goetze | |
| 6,919,648 | B2 * | 7/2005 | Bolz et al. | 290/40 C |
| 7,095,137 | B2 * | 8/2006 | Mackel et al. | 307/28 |
| 2004/0112320 | A1 | 6/2004 | Bolz | |
| 2006/0048733 | A1 * | 3/2006 | Bolz et al. | 123/179.3 |

FOREIGN PATENT DOCUMENTS

| | | |
|---|---|---|
| EP | 0 666 581 | 8/1995 |
| EP | 1 245 452 A1 | 10/2002 |
| GB | 475743 | 11/1997 |
| WO | WO 02/066293 | 8/2002 |

* cited by examiner

*Primary Examiner*—Stephen K. Cronin
*Assistant Examiner*—Arnold Castro
(74) *Attorney, Agent, or Firm*—Laurence A. Grennberg; Werner H. Stemer; Ralph E. Locher

(57) ABSTRACT

The invention relates to a method and a device for switching on a power switch (S1, S2) arranged between capacitive elements (C1, DLC, B36) a choke (L) being connected in parallel to the switching contacts of the still open power switch (S1, S2). Said choke enables compensating currents to flow between the elements (C1, B36, DLC) to be interconnected and to decay before the power switch (S1, S2) is then closed in a de-energized manner.

13 Claims, 3 Drawing Sheets

METHOD AND DEVICE FOR SWITCHING ON A POWER SWITCH ARRANGED BETWEEN CAPACITIVE ELEMENTS

BACKGROUND OF THE INVENTION

Field of the Invention

The invention relates to a method for switching on a power switch arranged between capacitive elements, in particular a relay actuated power switch in a motor vehicle equipped with an integrated starter-generator (ISG). The invention also relates to a device for implementing this method.

In a motor vehicle's electrical system having an ISG, switching operations are required between energy storage devices—accumulators of different rated voltages and capacitors (intermediate circuit capacitors, double layer capacitors)—by way of converters or switching controllers using power switches, which are performed by means of commands from a control device.

A condition in this situation is the fact that the switch current flowing through a switch before the switch opens is brought to 0 A, and that before a switch closes the switch voltage present between its switching contacts is brought to 0V, in order that the switch can be actuated in a power free state.

A switch current of 0 A can be produced for example by switching off the AC/DC converter or DC/DC switching controller, and presents no problem in practical terms.

Regulation to a 0V switch voltage, in other words no potential difference between the poles of the (open=non-conducting) switch, takes place as a rule through targeted recharging of one of the energy storage devices, an intermediate circuit capacitor for example since as a rule this is the smaller of the energy storage devices. In principle, this regulation can also be carried out by a converter or a switching controller situated between the latter and the motor vehicle's electrical system.

The intermediate circuit capacitor has a capacity of several 10,000 µF for example, the double layer capacitor has a capacity of 200 F for example, the accumulators have a capacity of several Ah. In this situation, the switch voltage to be compensated for can be up to 60V.

As a result of the unfavorable relationship between the performance of the converter (6 kW for example) or switching controller (1 kW for example) and the energy required for charging compensation (up to 40 Joules), tight limits are however imposed on the voltage compensation in practice.

If, for example, the switches are to be constructed using relays, then the level of precision which can thus be attained for the voltage compensation is not sufficient because the currents and performance levels occurring during normal operation require the use of components (capacitors, switches) with extremely low resistors. Given the existence of voltage differences, the equalizing currents across the switch which is to be closed are correspondingly high. In an extreme case this results in the destruction of the switches.

A restriction of the equalizing current flowing through the switch to a safe value normally presupposes a current measurement which requires a cost-intensive current sensor given the level of the currents occurring. However, this does not hold true only for the interconnection of capacitive elements in conjunction with integrated starter-generators but applies quite generally to the interconnection of capacitors, accumulators and also fuel cells.

SUMMARY OF THE INVENTION

The object of the invention is to set down a method and a corresponding device for switching on a power switch arranged between capacitive elements, which does not require a cost-intensive current sensor and whereby the switch-on sequence and the switch-on state are regulated in such a way that even in the case of a large difference in potential between the switching contacts of the power switch prior to it being switched on the possibility of damaging the power switch is excluded.

This object is achieved according to the invention by a method in accordance with the features of Claim 1 and a device in accordance with the features of Claim 4.

Advantageous developments of the invention are set down in the subclaims.

The invention comprises the technical teaching of bringing about a compensation of potential between the open switching contacts of the power switch by means of a lossy choke which can be connected in parallel with these switching contacts, whereby equalizing currents can flow by way of the choke and decay until there is practically no longer any difference in potential at the switching contacts of the power switch and there is no longer an equalizing current flowing before the power switch is switched on.

BRIEF DESCRIPTION OF THE DRAWING

An embodiment according to the invention will be described in detail in the following with reference to schematic drawings, in which.

DESCRIPTION OF THE PREFERRED EMBODIMENTS

Figure 1:
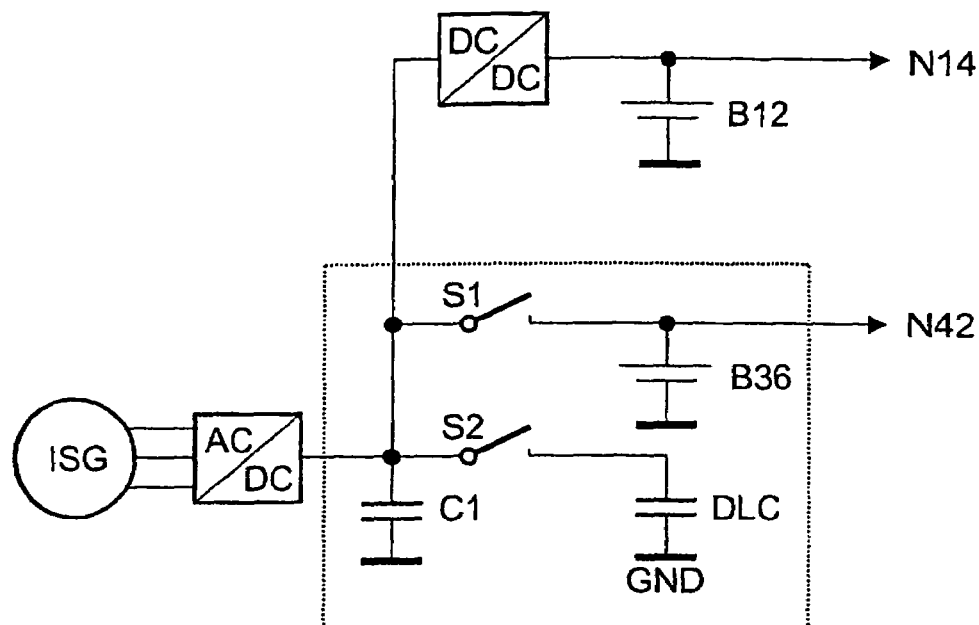
FIG. 1 shows a basic circuit diagram of a 14V/42V motor vehicle electrical system.

FIG. 1 shows a basic circuit diagram of a 14V/42V motor vehicle electrical system with an integrated starter-generator ISG coupled to an internal combustion engine, not shown, which serves as the basis for describing the invention.

This ISG is connected by way of a bidirectional AC/DC converter AC/DC a) directly to an intermediate circuit capacitor C1,
b) by way of a power switch S1 to a 36V accumulator B36 and a 42V electrical system N42,
c) by way of a power switch S2 to a double layer capacitor DLC, and
d) by way of a bidirectional DC/DC converter DC/DC to a 12V accumulator B12 and a 14V electrical system N14.

Figure 2:
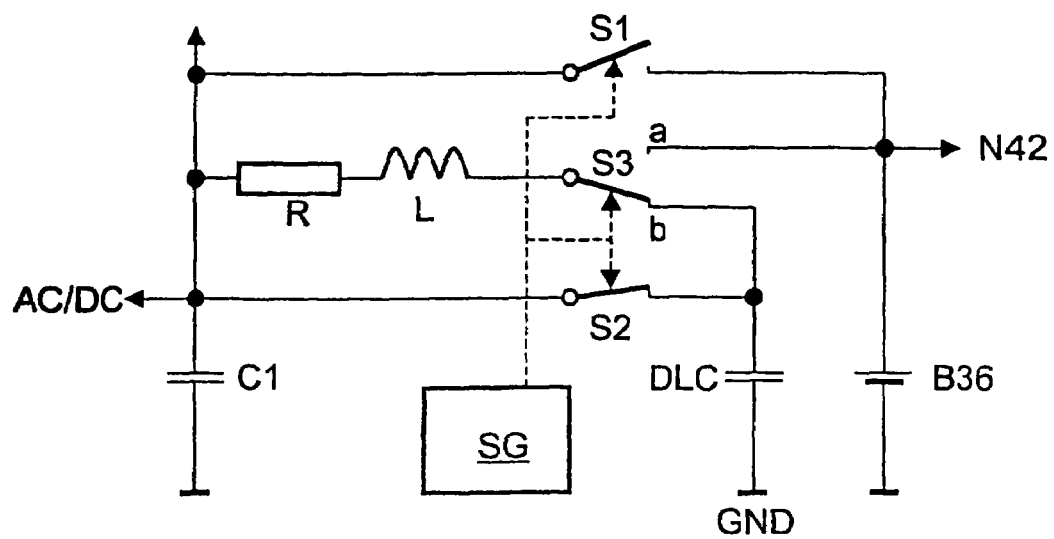
FIG. 2 shows a partial circuit from FIG. 1 including choke.

FIG. 2 shows the partial circuit enclosed in the dotted frame from FIG. 1, into which is inserted a series circuit comprising a choke L (represented by its ohmic resistor R, which can also be a further real resistor connected in series with it) and a changeover switch S3. When switch S3 is in position a this series circuit lies parallel to the switching contacts of switch S1, and when switch S3 is in position b it lies parallel to the switching contacts of switch S2. The changeover switch S3 can also consist of two on-off switches. The switches S1, S2 and S3 are actuated by a control device SG.

The embodiment according to FIG. 2 makes it possible to connect the intermediate circuit capacitor C1 to the accumulator B36 and alternatively to the double layer capacitor DLC. The switch-on command UM for switching on a power switch is accordingly a changeover command and the switch S3 is accordingly a changeover switch instead of an on-off switch.

In FIG. 2, the intermediate circuit capacitor C1 is connected to the double layer capacitor DLC by way of the closed (conducting) switch S2, to which the series circuit comprising resistor R, choke L and changeover switch S3 (in position b) is connected in parallel, whereas it is separated from the accumulator B36 by way of the open (non-conducting) switch S1.

Figure 4:
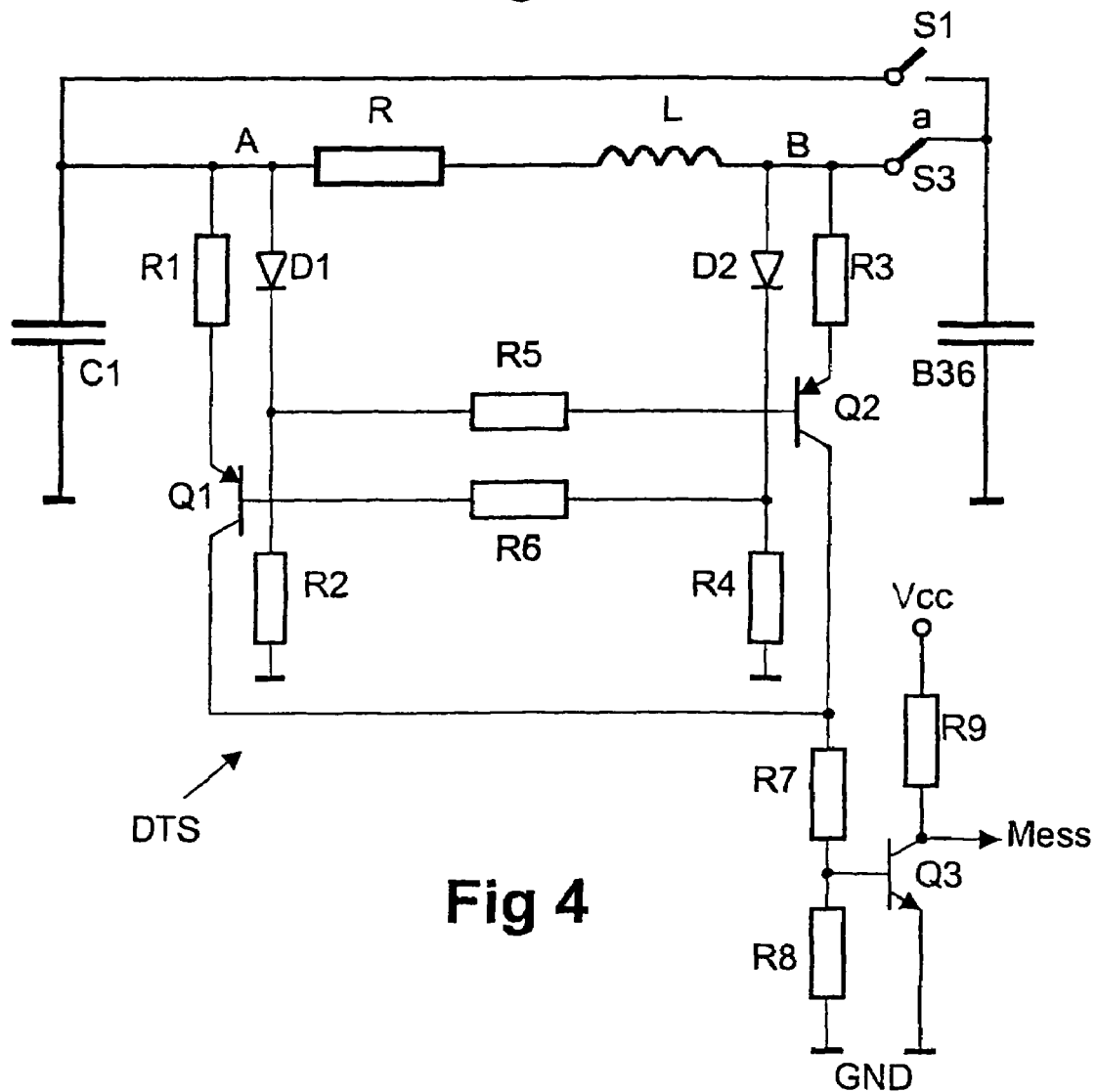
FIG. 4 shows a circuit for determining the equalizing current by way of the voltage drop at the choke L.

If the intermediate circuit capacitor C1, to which a high voltage of 60V is applied which has been impressed on it for example by the double layer capacitor DLC, is now to be connected to the accumulator B36 which has a voltage of 36V, then initially switch S2 is opened by the control device SG; switch S3 still remains in its switching position b until both switches S1 and S2 have been safely opened and only then is brought into switching position a (FIG. 4).

Figure 3:
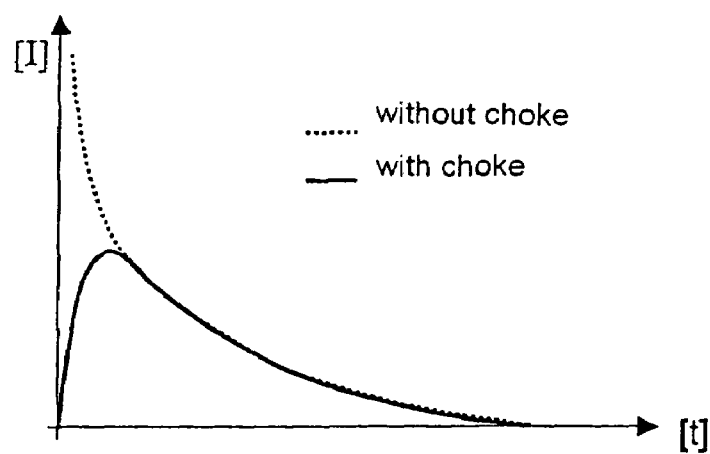
FIG. 3 shows the flow of the equalizing current with and without choke.

Since the intermediate circuit capacitor C1 has a different potential than the accumulator B36 which is now connected to it—by way of the choke L—an equalizing current will flow by way of the choke L. Since the latter does not permit a sudden current variation the current will begin to increase from 0 A, as is shown in FIG. 3. Without the choke connected in parallel by way of switch S3, a high current surge would occur on closing the power switch S1, as shown by the dotted curve in FIG. 3, which could destroy the power switch.

Since the potential compensation becomes smaller as the current increases, the equalizing current drops off again. A current maximum is thus quickly attained, followed by an exponential decaying of the equalizing current which ends with a potential compensation.

When the equalizing current has decayed, then there is no longer any danger of directly connecting the accumulator B36 with the intermediate storage device C1 by way of the switch S1. The major advantage consists in the fact that the relevant switch S1 or—in the opposite case S2—can be switched to be free of current and voltage.

Since the equalizing current does not attain a stationary value, a voltage $U=L*di/dt$ which is proportional to the current is induced across the choke L. In addition, a voltage drop results across the ohmic resistor R of the choke L which takes effect at the vertex of the equalizing current, where $di/dt=0$. In addition, this ohmic resistor R limits the maximum current and dampens the overall system (resonant circuit) comprising capacitor, accumulator and choke.

Because the rise in current causes a voltage change at the choke, it is possible to dispense with a direct current measurement and this can take place by way of the measurement of the voltage, proportional to the current, present at the choke L (and its ohmic resistor R).

FIG. 4 shows a detection circuit DTS for detecting the equalizing current which flows when two capacitive elements having different voltages are connected to one another, in other words in this case when the intermediate circuit capacitor C1 is disconnected from the double layer capacitor DLC with which it is connected in FIG. 2 and is connected to the accumulator B36 (or vice versa).

FIG. 4 shows the partial circuit from FIG. 2, in which switch S1 continues to be open and switch S3 is switched from position b (FIG. 2) to its position a.

The elements C1, B36, R, L, S1 and S3 and their connections are known from FIG. 2.

A series circuit comprising a resistor R1 and the emitter-collector path of a pnp transistor Q1 branches off at the connection point A between the intermediate circuit capacitor C1 and the resistor R (or the choke), and a series circuit comprising a resistor R3 and the emitter-collector path of a pnp transistor Q2 also branches off at the connection point B between choke L and switch S3. The collectors of the two transistors Q1 and Q2 are connected to one another, and to ground GND by way of the series circuit comprising two resistors R7 and R8.

A series circuit comprising a diode D1 conducting current to ground and a resistor R2 is located between the connection point A and ground GND, and a series circuit comprising a diode D2 conducting current to ground and a resistor R4 is also located between the connection point B and ground GND.

The connection point between diode D1 and resistor R2 and the base of the pnp transistor Q2 are connected by means of a resistor R5, likewise the connection point between diode D2 and resistor R4 and the base of the pnp transistor Q1 by means of a resistor R5.

Figure 5:
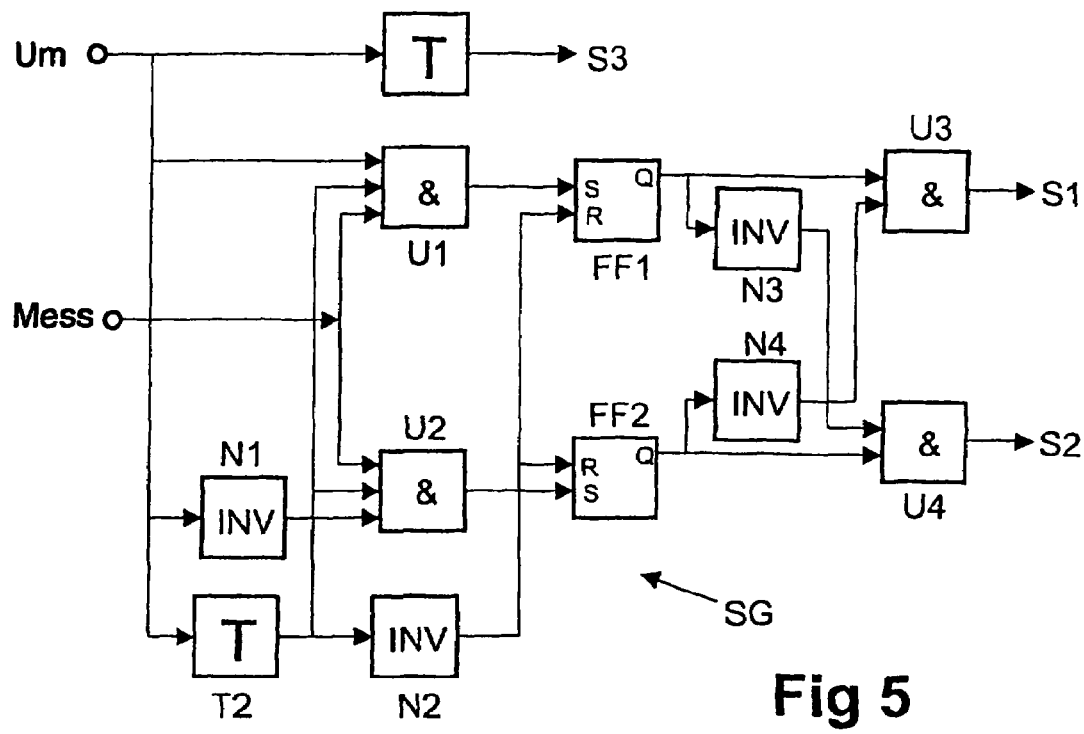
FIG. 5 shows a control device, insofar as it concerns the control of the switches S1 to S3.

The connection point between the two resistors R7 and R8 is connected to the base of an npn transistor Q3 whose emitter is connected to ground GND, and whose collector is connected on the one hand by way of a resistor R9 to a supply voltage Vcc of +5V for example, and is connected on the other hand to a terminal Mess of the control device SG shown in FIG. 5.

As already mentioned in the description of FIG. 2, a high voltage of 60V is present at the intermediate circuit capacitor C1 and a voltage of 36V is present at the accumulator B36, for example.

Switch S2 is opened before switch S3 changes over. From the moment at which switch S3 is changed to its switch position an equalizing current begins to flow from C1 by way of R and L to B36 in accordance with FIG. 3. This equalizing current causes a drop in voltage at the choke L (and R). In this case, a higher potential is accordingly present at connection point A than at connection point B.

Given an appropriate design of the circuit (FIG. 4), a higher potential is then present at the emitter of the transistor Q1 than at its base, at which a potential proportional to the potential of the connection point B is present, with the result that Q1 is switched to conducting.

As long as the equalizing current exceeds a certain value and the emitter-base voltage of the pnp transistor Q1 is thus exceeded, transistor Q1 will remain conducting and a current will flow from connection point A by way of R1, Q1, R7 and R8 to ground GND, which raises the base voltage of the npn transistor Q3, as a result of which the latter becomes conducting and this causes the signal Mess to change from an H signal to an L signal.

In the case where the potential at the connection point B is higher than at connection point A, then pnp transistor Q2 and thus also npn transistor Q3 become conducting. The circuit is designed symmetrically around the transistors Q1 and Q2 for this reason.

FIG. 5 shows the control device SG insofar as it relates to control of the switches S1 to S3. This will be described in more detail below.

Figure 6:
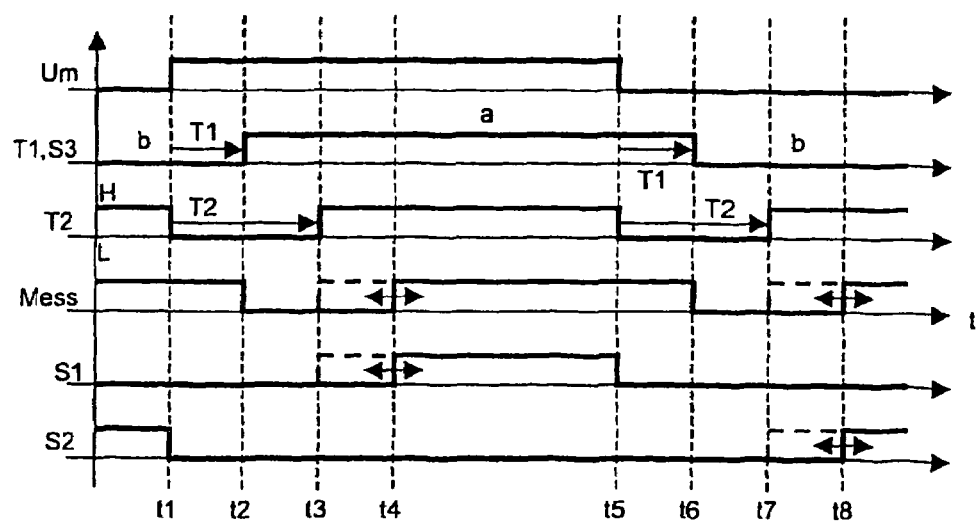
FIG. 6 shows a signal diagram for the switching commands and switch settings for this control device.

The corresponding signal levels and switch positions of switches S1 to S3 at particular points in time can be seen from FIG. 6.

Both figures will be described in the following, whereby reference will be made primarily to FIG. 6.

On the basis of the switch positions in FIG. 2 (S1 open, S2 closed and S3 in position b) the intermediate circuit capacitor C1, which was previously connected to the double layer capacitor DLC, is to be connected to accumulator B36.

A changeover command Um from a part of the control device SG which is not shown, which was an L signal (Low signal) prior to point in time t1, jumps from L to H (High signal) at point in time t1.

Two timer elements T1 and T2 are activated at the same time as the changeover command.

In this situation, T1 is a dual-edge triggered delay element. It delays the changeover of switch S3 (from switch position b to a, or vice versa) caused by both edges of the changeover command Um by a delay time T1 and is intended to ensure that all switches, which are actually relay switches in this embodiment, have safely reached their new switch positions after this delay time T1 has elapsed. Dependent on the currents to be switched, relays having a larger physical form of construction and consequently having significantly greater switching times are required for the power switches S1 and S2 than for switch S3.

T2 takes the form of a dual-edge triggered monoflop which generates an L pulse having the duration T2, which is longer than T1, both on the rising edge and also on the falling edge of the changeover signal Um. This monoflop prevents the switch that is being switched on, now S1, from being switched on before the delay time T2 has elapsed if, for example, no major charge compensation is taking place, which situation is difficult to detect but which would nevertheless cause a large equalizing current.

If only two elements, C1 and B36 for example, are present which are to be connected to one another or disconnected from one another, the timer elements T1 and T2 only need to be triggered by the activating edge (from L to H) of the changeover signal Um, in other words be single-edge triggered, since a switch-off of the power switch takes place in a current-free and no-voltage situation.

At the same time as the changeover command Um appears, switch S2 is initially opened (in FIG. 6, from H to L). Switch S1, which was open prior to point in time t1, remains in this position. The measurement signal Mess output by the circuit from FIG. 4 is H since prior to the changeover command and up to the point when the delay time T1 elapsed (point in time t2) the charges were compensated for, and no equalizing current is flowing.

After the delay time T1 has elapsed, switch S3 is changed over at point in time t2 from switch position b (L level) to switch position a (H level). From this point in time t2 an equalizing current flows from C1 (60V) to B36 (36V) which causes the measurement signal Mess to jump from H to L at point in time t2 and to dwell at this level until the equalizing current has decayed.

This takes place at point in time t4 which can occur earlier or later depending on the charge difference. At this point in time t4 switch S1 is then switched on, which can not however take place before the delay time T2 has elapsed, in other words not before point in time t3. Switch S1 has thus been switched in a current-free and no-voltage situation.

Switching back, in other words reconnecting the intermediate circuit capacitor C1 to the double layer capacitor DLC, takes place in the same sequence, as described in the following.

The changeover command Um which is executed to this end jumps from H to L at point in time t5. At the same time both timer elements T1 and T2 are activated again.

At the same time as the changeover command Um, first of all switch S1 is opened (in FIG. 6, from H to L). Switch S2, which prior to point in time t5 was open (L level), continues to remain in this position. The measurement signal Mess is H since prior to the changeover command and up to the point when the delay time T1 elapsed (point in time t6) the charges were compensated for, and no equalizing current is flowing.

After the delay time T1 has elapsed, switch S3 is changed over at point in time t6 from switch position a (H level) to switch position b (L level). From this point in time t6 an equalizing current flows from DLC (60V) to C1 (36V) which causes the measurement signal Mess to jump from H to L at point in time t6 and to dwell at this level until the equalizing current has decayed.

This takes place at point in time t8 which can again occur earlier or later depending on the charge difference. At this point in time t8 switch S2 is then switched on (from L to H level), which again can not however take place before the delay time T2 has elapsed, in other words not before point in time t7. Switch S2 has thus again been switched in a current-free situation.

The two timer elements T1 and T2 have already been described in the circuit for the control device according to FIG. 5.

Timer element T1 converts the switching command Um for changing the switch S3 over from position a to b, or vice versa, delayed by the delay time T1.

Timer element T2 goes to L level for the duration of the delay time T2 with each edge change of the changeover signal Um.

Two triple AND gates U1 and U2 combine the signals Um (AND gate U1) or (inverted by way of the inverter N1) "re-inverted" (AND gate U2), output signal from T2, and current measurement signal Mess. Only when all three input signals for U1 or U2 have an H level does the corresponding output signal also have an H level. This is equivalent to an interlock which ensures that the compensation operation taking place by way of switch S3 has been completed and current is no longer flowing through the latter.

Two downstream flipflops FF1 and FF2 are reset by the output signal from the timer element T2 which has been inverted by the inverter N2. AND gate U1 or AND gate U2 sets the flipflop FF1 or FF2 after the delay time T2 has elapsed.

The inverters N3, N4 and the AND gates U3 and U4 serve to ultimately ensure that it is not possible to simultaneously switch on the switches S1 and S2.

We claim:

1. A method for switching on a power switch disposed between capacitive elements, which comprises the steps of:
   connecting at least one compensating element for equalizing currents flowing between the capacitive elements which are to be connected to one another and can decay before the power switch is subsequently closed in a current-free and no-voltage situation, the compensating element being connected in parallel to switching contacts of the power switch which is in an open position.

2. The method according to claim 1, which further comprises delaying the parallel connection of the compensating element with respect to a switch-on command for switching on the power switch by a first delay time.

3. The method according to claim 1, which further comprises switching-on of the power switch only after an equalizing current has decayed and only when a second delay time beginning with a switch-on command has elapsed.

4. A method for switching on a power switch disposed between capacitive elements, which comprises the steps of:
connecting at least one compensating element for equalizing currents flowing between the capacitive elements which are to be connected to one another and can decay before the power switch is subsequently closed in a current-tree and no-voltage situation, the compensating element being connected in parallel to switching contacts of the power switch which is in an open position, the compensating element functioning as a choke.

5. The method according to claim 4, which further comprises delaying the parallel connection of the compensating element with respect to a switch-on command for switching on the power switch by a first delay time.

6. The method according to claim 4, which further comprises switching-on of the power switch only after an equalizing current has decayed and only when a second delay time beginning with a switch-on command has elapsed.

7. A device for switching on a power switch disposed between capacitive elements, comprising:
a further switch;
a compensating element functioning as a choke can be connected in parallel with switching contacts of the power switch in a still open position through said further switch;
a detection circuit for detecting a current flowing between the capacitive elements which are to be connected to one another; and
a control device for closing the power switch as soon as no equalizing current flowing by way of said choke is detected by said detection circuit.

8. The device according to claim 7, further comprising a resistor connected in series with said choke, said resistor being selected from the group consisting of an ohmic resistor of said choke and a real resistor.

9. The device according to claim 7, wherein
said control device has a terminal; and
said detection circuit includes:
  a ground terminal;
  a first series circuit containing a first resistor and an emitter-collector path of a first pnp transistor, said first series circuit connected to a first terminal point of said choke and said first pnp transistor having a collector and a base; and
  a second series circuit containing a second resistor and an emitter-collector path of a second pnp transistor, said second series circuit connected to a second terminal point of said choke and said second pnp transistor having a base and a collector connected to said collector of said first pnp transistor;
  a third series circuit containing a third and a fourth resistor connected between said collectors and said ground terminal;
  a fourth series circuit containing a first diode conducting current to said ground terminal and a fifth resistor, said fourth series circuit connected between said first terminal point and said ground terminal;
  a fifth series circuit containing a second diode conducting current to said ground terminal and a sixth resistor, said fifth series circuit disposed between said second terminal point and said ground terminal;
  a seventh resistor, connected between a connection point between said first diode and said fifth resistor and said base of said second pnp transistor;
  an eighth resistor connected between a connection point between said second diode and said sixth resistor and said base of said first pnp transistor;
  a third npn transistor having a base, a collector and an emitter connected to said ground terminal, said base of said third npn transistor connected to a connection point between said third and fourth resistors; and
  a ninth resistor connected on a first side to a supply voltage and a second side to said collector of said third npn transistor and to said terminal of said control device.

10. The device according to claim 7, wherein a switching-off of the power switch takes place at an end of a switch-on command.

11. The device according to claim 7, wherein the power switch is a plurality of relay-controlled switches.

12. The device according to claim 7, wherein said control device includes:
a first delay element for delaying the parallel connection of said choke to said power switch being in an open position by a predefined first delay time starting from a switch-on command; and
a second delay element being a monoflop permitting a switch-on of the power switch at an earliest after a second delay time has elapsed which is longer than the first delay time and starts running at a beginning of the switch-on command.

13. The device according to claim 12, wherein for connecting one of the capacitive elements to other ones of the capacitve elements:
said further switch is a changeover switch;
said first delay element is a dual-edge triggered delay element;
said second delay element is a dual-edge triggered monoflop; and
the power switch is opened upon the appearance of the switch on command, which functions as a changeover command.

* * * * *